Figure 1:
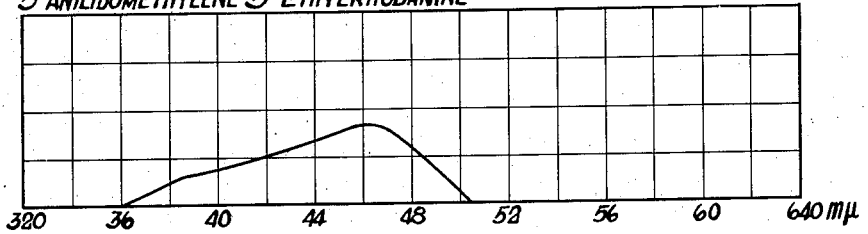

July 11, 1939.  L. G. S. BROOKER  2,165,339
PHOTOGRAPHIC EMULSION
Filed Sept. 16, 1936   2 Sheets-Sheet 1

5-ANILIDOMETHYLENE-3-ETHYLRHODANINE

5-ACETANILIDOMETHYLENE-3-PHENYLRHODANINE

5-ANILIDOMETHYLENE-3-ETHYL-2-THIO-2,4-OXAZOLEDIONE 5-(γ-ACETANILIDOALLYLIDENE)-1,3-DIPHENYL-2-THIOHYDANTOIN

Leslie G. S. Brooker, INVENTOR
BY N. M. Perrins
Daniel J. Mayne
ATTORNEYS.

July 11, 1939.　　L. G. S. BROOKER　　2,165,339
PHOTOGRAPHIC EMULSION
Filed Sept. 16, 1936　　2 Sheets-Sheet 2

5-(γ-ANILIDOALLYLIDENE)-3-ETHYLRHODANINE 4-(γ-ANILIDOALLYLIDENE)-1-BENZOTHIAZYL-3-METHYL-5-PYRAZOLONE 5-(γ-ANILIDOALLYLIDENE)-3-ETHYL-1-PHENYL-2-THIOHYDANTOIN 5-(γ-ANILIDO-β-BROMO-ALLYLIDENE)-3-PHENYLRHODANINE

Leslie G. S. Brooker,
INVENTOR.

BY
ATTORNEYS.

Patented July 11, 1939

2,165,339

UNITED STATES PATENT OFFICE 2,165,339

PHOTOGRAPHIC EMULSION

Leslie G. S. Brooker, Rochester, N. Y., assignor to Eastman Kodak Company, Rochester, N. Y., a corporation of New Jersey Application September 16, 1936, Serial No. 101,105

10 Claims. (Cl. 95—7)

This invention relates to hemioxonol dyes and photographic emulsions containing the same.

Dyes of the cyanine class and dyes of the merocyanine class are known to alter the sensitivity of photographic emulsions, particularly photograhic silver salt emulsions. Now, I have found that dyes of the hemioxonol class alter the sensitivity of photographic emulsions. I have also found new and heretofore unknown dyes of the hemioxonol class. The object, therefore, of my invention is to provide photographic emulsions containing dyes of the hemioxonol class. A further object is to provide new hemioxonol dyes and a process for the preparation thereof. Other more specific objects will become apparent upon a complete perusal of these specifications.

The name hemioxonol is a new name and has not heretofore been applied to the dyes hereinafter described. In fact, the hereinafter described dyes have not heretofore been considered as members of one class. According to this new system of classification these hemioxonol dyes can be represented by the following general formula:

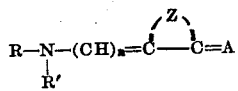

wherein A represents a divalent non-metallic atom, such as oxygen or sulfur, $n$ represents a positive odd integer, R represents hydrogen, an alkyl group or an acyl group, R' represents an aryl group and Z represents the non-metallic atoms necessary to complete a five-membered or six-membered heterocyclic nucleus.

More particularly R can represent an alkyl group, such as methyl, ethyl or n-butyl, or an acyl group, such as acetyl, propionyl or benzoyl. R' can represent an aryl group such as phenyl, chlorophenyl, diphenyl or naphthyl. Z can represent the non-metallic atoms necessary to complete a thiazolone, an oxazolone, an imidazolone, a pyrazolone, a thioindoxyl or like nucleus. Examples of thiazolone nuclei are: a 2,4(3,5)-thiazoledione nucleus, or its nitrogen substituted derivatives, e. g. N-alkyl or N-phenyl derivatives, a 2-thio-2,4(3,5)-thiazoledione nucleus, i. e. rhodanine or its nitrogen substituted derivatives, e. g. 3-alkyl-rhodanines, 3-phenylrhodanines, 3-naphthylrhodanines, 3-pyrazolonylrhodanines, a 2,4-dithio-2,4(4,5)-thiazoledione nucleus, or its nitrogen substituted derivatives, a 4-thiazoledione nucleus or its nitrogen substituted derivatives, a 2-substituted-mercapto-4(5)-thiazolone nucleus such as a 2-alkylmercapto-4(5)-thiazolone, or a 2-substituted-amino-4(5)-thiazolone nucleus, such as a 2-dialkyl-amino-4(5)-thiazolone, a 2-alkylphenylamino-4(5)-thiazolone or a 2-diphenylamino-4(5)-thiazolone. Examples of oxazolone nuclei are: a 2-thio-2,4(3,5)-oxazoledione nucleus. Examples of imidazolone nuclei are: hydantoin or its nitrogen substituted derivatives, e. g. N-alkyl or N-phenyl derivatives, 2-thiohydantoin or its nitrogen substituted derivatives or a 2-substituted-mercapto-5(4)-imidazolone, such as a 2-alkylmercapto-5(4)-imidazolone. Examples of pyrazolone nuclei are: 1-phenyl-3-alkyl-5-thiopyrazolone, 1-naphthyl-3-alkyl-5-thiopyrazolone and 1-phenyl-3-alkyl-5-pyrazolone. Z can also represent the non-metallic atoms necessary to complete a barbituric acid (2,4,6-triketohexahydropyrimidine), 2-thiobarbituric acid, a 1,3-dihydroxyquinoline, dihydrocarbostyrill, oxydihydroquinoxalin, benzo-β-morpholone, homophthalimide or the like six-membered nuclei. All of the above five- and six-membered nuclei are derived from heterocyclic compounds containing a nuclear methylene group adjacent to a nuclear carbonyl or thiocarbonyl group, i. e. heterocyclic compounds characterized by the nuclear grouping:

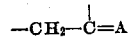

wherein A represents oxygen or sulfur.

When $n$ represents one in the above formula the dyes contain a chain of one methenyl group (—CH=) and are conveniently referred to as hemicarboxonol dyes, when $n$ represents three the dyes contain a chain of three methenyl groups (—CH=CH—CH=) and are conveniently referred to as hemidicarboxonol dyes, and when $n$ represents five the dyes contain a chain of five methenyl groups (—CH=CH—CH=CH—CH=) and are conveniently referred to as hemitricarboxonol dyes.

Members of the hemicarboxonol group are known and have been described by Dains et al. See for example J. Chem. Soc. 31, 1148 (1909); 44, 2310 (1922) and Kansas Univ. Science Bull. 15, 265 (1924); 19, 215 (1930). Hemicarboxonol dyes from pyrazolones have also been described by Rodd and Watts in British Patent 366,964. Hemicarboxonol dyes can be prepared by reacting a diarylformamidine with a heterocyclic compound containing a nuclear methylene group adjacent to a nuclear carbonyl or thiocarbonyl group. Diarylformamidines which can be used are for example, diphenylformamidine, dinaphthylformamidine, dixylylformamidine or the like. The following examples serve to illustrate the preparation of hemicarboxonol dyes. These examples are not intended to limit my invention.

Example 1.—5-anilidomethylene-3-ethylrhodanine 3.2 g. (1 mol.) of 3-ethylrhodanine, 3.9 g. (1 mol.) of diphenylformamidine and 15 cc. of kerosene were heated under reflux at about 120° C. The reaction product separated from the warm reaction mixture. The reaction mixture was chilled and the product filtered off and washed with cold methyl alcohol. The product was recrystallized from glacial acetic acid. The compound has the following formula:

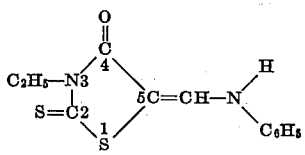

This compound can be converted into 5-acetanilidomethylene-3-ethylrhodanine by refluxing 1.3 g. (1 mol.) thereof with 10 cc. of acetic anhydride and 0.5 g. (1 mol.) of triethylamine for about 10 minutes. The acetanilido derivative separated from the cooled reaction mixture and after two recrystallizations from methyl alcohol was obtained as pale yellow crystals, melting at 128–130° C. The acetanilido compound has the following formula:

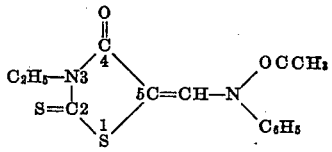

Example 2.—5-anilidomethylene-3-phenylrhodanine

Equimolecular proportions of 3-phenylrhodanine and diphenyl-formamidine were treated as in Example 1. The product was recrystallized from methyl alcohol.

This compound can be converted into 5-acetanilidomethylene-3-phenylrhodanine by refluxing 1.55 g. (1 mol.) thereof with 15 cc. of acetic anhydride and 0.5 g. (1 mol.) of triethylamine for about 15 minutes. The acetanilido derivative separated from the cooled reaction mixture and after two recrystallizations from methyl alcohol was obtained as minute yellow crystals melting at 194–196° C. with decomposition. The acetanilido compound has the following formula:

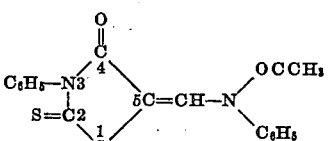

Example 3.—5-anilidomethylene-3-ethyl-2-thio-2,4(3,5)-oxazoledione

Equimolecular proportions of 3-ethyl-2-thio-2,4(3,5)-oxazoledione and diphenylformamidine were treated as in Example 1. The product was recrystallized from methyl alcohol.

This compound can be converted into 5-acetanilidomethylene-3-ethyl-2-thio-2,4(3,5)-oxazoledione by heating 8.7 g. (1 mol.) thereof with 30 cc. of acetic anhydride and 3.7 g. (1 mol. of triethylamine at about 100° C. for about 10 minutes. The acetanilido derivative separated from the cooled reaction mixture and after two recrystallizations from methyl alcohol was obtained as nearly colorless crystals melting at 150-160° C. The acetanilido compound has the following formula:

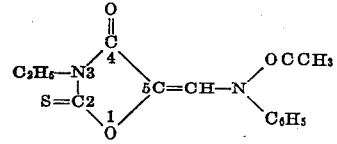

In a manner similar to that illustrated in the above three examples other heterocyclic compounds containing a nuclear methylene group adjacent to a nuclear carbonyl or thiocarbonyl group can be reacted with diarylformamidines to give hemicarboxonol dyes. Examples of such other heterocyclic compounds correspond to the five- and six-membered heterocyclic nuclei named in connection with the above general formula for these hemioxonol dyes.

Members of the hemidicarboxonol group were heretofore unknown and I have found that they can be prepared by reacting a heterocyclic compound containing a nuclear methylene group adjacent to a nuclear carbonyl or thiocarbonyl group with a compound of the formula:

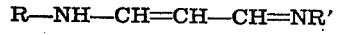

R—NH—CH=CH—CH=NR' wherein R and R' represent aryl groups such as phenyl, chlorophenyl, diphenyl, naphthyl or the like. Such latter compounds can be referred to as arylamino acrolein anils and are advantageously employed in the form of their salts, such as their hydrochlorides. When the arylamino acrolein anils are employed in the form of their salts, the reactions are advantageously effected in the presence of a strong organic base, such as triethylamine, piperidine, N-methyl-piperidine, triethanolamine, diethylamine or the like. Weaker organic bases such as pyridine can be used. The reactions can be effected using arylamino acrolein anils or their salts, in the presence of acetic anhydride or acetic anhydride and potassium or sodium acetate. Propionic or butyric anhydride can also be used.

The following examples serve to illustrate the preparation of hemicarboxonol dyes. These examples are not intended to limit my invention.

Example 4.—5-(γ-acetanilidoallylidene)-3-ethylrhodanine 3.2 g. (1 mol.) of 3-ethylrhodanine, 5.2 g. (1 mol.) of β-anilinoacrolein anil hydrochloride and 30 cc. of acetic anhydride were heated under reflux for about one hour. The compound separated from the cooled reaction mixture and after two recrystallizations from methyl alcohol was obtained as pale yellow crystals melting at 225.5–226.5° C. The compound has the following formula:

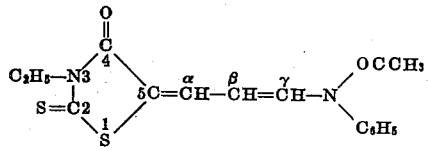

Example 5.—5-(γ-anilinoallylidene)-3-ethylrhodanine 0.8 g. (2 mol.) of 3-ethylrhodanine, 0.02 g. (1 mol.) of β-anilinoacrolein anil hydrochloride and 0.21 g. (1 mol.) of piperidine were allowed to react at room temperature for about 2½ hours in 10 cc. of absolute ethyl alcohol. The compound separated from the reaction mixture and after recrystallization from methyl alcohol was obtained as garnet crystals with a blue reflex. The compound has the following formula:

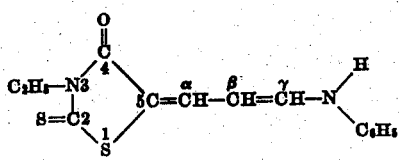

This compound can be converted into the acetylated form by treating with acetic anhydride in the presence of triethylamine. See Example 1.

*Example 6.—5-(γ-anilinoallylidene)-3-ethyl-2-thio-2,4(3,5)-oxazoledione*

0.72 g. (2 mol.) of 3-ethyl-2,4(3,5)-oxazoledione, 0.62 g. (1 mol.) of β-anilinoacrolein anil hydrochloride, and 0.21 g. (1 mol.) of piperidine were allowed to react at room temperature for about one hour in 100 cc. of absolute ethyl alcohol. The compound separated from the reaction mixture and after recrystallization from methyl alcohol was obtained as pinkish orange needles. The compound has the following formula:

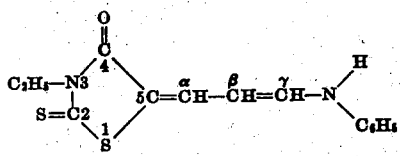

This compound can be converted into the acetylated form by treating with acetic anhydride in the presence of triethylamine. See Example 1.

*Example 7.—5-(γ-anilino-β-bromo-allylidene)-3-phenylrhodanine*

2.1 g. (2 mol.) of 3-phenylrhodanine, 1.91 (1 mol.) of β-anilino-α-bromo-acrolein anil hydrobromide and 0.64 g. (1.5 mol.) of piperidine were allowed to react at room temperature for about 20 hours. The compound separated from the reaction mixture and after recrystallization from glacial acetic acid was obtained as reddish brown needles. The compound has the following formula:

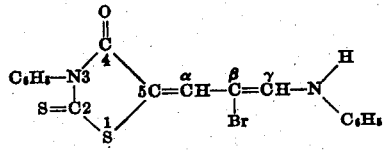

*Example 8.—5-(γ-anilino-allylidene)-3-ethylrhodanine*

0.8 g. (2 mol.) of 3-ethylrhodanine, 0.62 g. (1 mol.) of β-anilinoacrolein anil hydrochloride and 0.21 g. (1 mol.) of piperidine were allowed to react at room temperature for about 2½ hours. The compound separated from the reaction mixture and after recrystallization from methyl alcohol was obtained as garnet crystals. The compound has the following formula:

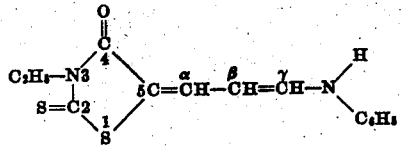

*Example 9.—5-(γ-acetanilido-allylidene)-2-diphenylamino-4(5)-thiazolone*

2.7 g. (1 mol.) of 2-diphenylamino-4(5)-thiazolone, 2.6 g. (1 mol.) of β-anilinoacrolein anil hydrochloride and 20 cc. of acetic anhydride were heated to refluxing for 30 minutes. The compound separated from the cooled reaction mixture. After two recrystallizations from methyl alcohol, the compound was obtained as minute yellow crystals melting at 265°–267° C.

*Example 10.—5-(γ-anilido-allylidene)-3-ethyl-2,4(3,5)-oxazoledione*

2.9 g. (1 mol.) of 3-ethyl-2-thio-2,4(3,5)-oxazoledione, 5.2 g. (1 mol.) of β-anilinoacrolein and hydrochloride, 30 cc. of absolute ethyl alcohol and 2.0 g. (2 mol.) of triethylamine were heated to refluxing for about 30 minutes. The compound separated from the cooled reaction mixture.

This compound can be acetylated as follows: 5.8 g. (1 mol.) of 5-(γ-anilido-allylidene)-3-ethyl-2-thio-2,4(3,5)-oxazoledione, 30 cc. of acetic anhydride and 2.0 g. (1 mol.) of triethylamine were heated to refluxing for about 5 minutes. The product separated from the cooled reaction mixture. After two recrystallizations from methyl alcohol, the product was obtained as minute greenish yellow crystals, melting at 247°–249° C. with decomposition. The acetylated product has the following formula:

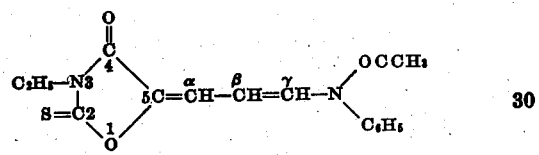

*Example 11.—4-(γ-acetanilido-allylidene)-1-benzothiazyl-3-methyl-5-pyrazolone*

4.6 g. (1 mol.) of 1-benzothiazyl-3-methyl-5-pyrazolone, 5.2 g. (1 mol.) of β-anilino-acrolein anil hydrochloride and 25 cc. of acetic anhydride were heated to refluxing for 10 minutes. The product separated from the cooled reaction mixture. The product has the following formula:

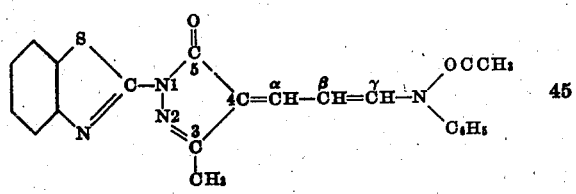

*Example 12.—5-(γ-anilido-allylidene)-3-ethyl-1-phenyl-2-thiohydantoin*

4.49 g. (1 mol.) of 3-ethyl-1-phenyl-2-thiohydantoin, 5 g. (1 mol.) of β-anilino-acrolein anil hydrochloride, 30 cc. absolute ethyl alcohol and 2.0 g. (1 mol.) of triethylamine were refluxed for about 30 minutes. The product separated from the cooled reaction mixture.

This compound can be acetylated as follows: 1.75 g. (1 mol.) of the anilido compound, 10 cc. of acetic anhydride and 1.5 g. (1 mol.) of triethylamine were heated for about 15 minutes. The product separated from the cooled reaction mixture. After two recrystallizations from methyl alcohol it was obtained as yellow crystals, melting at 184°–186° C. with decomposition. The acetylated compound has the following formula:

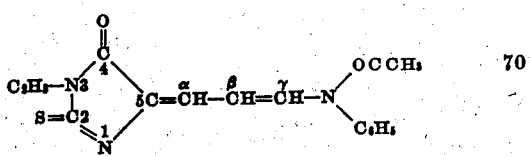

Example 13.—4-(γ-acetanilido-allylidene)-3-methyl-1-phenyl-5-pyrazolone 3.5 g. (1 mol.) of 3-methyl-1-phenyl-5-pyrazolone, 5 g. (1 mol.) of β-anilinoacrolein anil hydrochloride, 20 cc. of acetic anhydride and 2 g. (1 mol.) of triethylamine were refluxed for about 30 minutes. The product separated from the cooled reaction mixture. After two recrystallizations from methyl alcohol, the product was obtained as flaky orange crystals, melting at 212°–214° C. The product has the following formula:

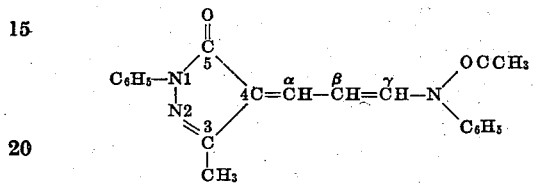

In a manner similar to that illustrated in the above ten examples other heterocyclic compounds containing a nuclear methylene group adjacent to a nuclear carbonyl or thiocarbonyl group can be reacted with arylamino acrolein anils to give hemidicarboxonol dyes. Examples of such other heterocyclic compounds correspond to the five- and six-membered heterocyclic nuclei named in connection with the above general formula for these hemioxonol dyes.

Members of the hemitricarboxonol group were heretofore unknown and I have found that they can be prepared by reacting a five- or six-membered heterocyclic compound containing methylene group, a nuclear methylene group adjacent to a nuclear carbonyl or thiocarbonyl group, with a compound of the following formula:

wherein R and R' represent aryl groups, such as phenyl, chlorophenyl, toluyl, diphenyl, or naphthyl groups. Such compounds are advantageously employed in the form of their salts, such as their hydrochlorides. Such compounds can be referred to as ω-arylamino-Δ2,4-pentadienal anils. When employing the salts of the anils the reactions are advantageously carried out in the presence of a strong organic base, such as triethylamine, piperidine, diethylamine, triethanolamine or N-methylpiperidine. Weaker organic bases such as pyridine can be used. The reactions can also be carried out employing the anils or their salts in the presence of acetic anhydride or acetic anhydride and sodium or potassium acetates. Propionic and butyric anhydrides can also be used.

The following examples serve to illustrate the prepartion of hemitricarboxonol dyes. These examples are not intended to limit my invention.

Example 14.—5-(ω-anilino-Δ2,4-pentadienylidene)-3-phenyl-2,4(3,5)-thiazoledione 1.93 g. (2 mol.) of 3-phenyl-2,4-thiazoledione, 1.43 g. (1 mol.) of glutaconic aldehyde dianilide hydrochloride and 0.45 g. (1 mol.) of piperidine were allowed to react at room temperature in absolute ethyl alcohol (50 cc.) for about 16½ hours. The compound separated from the reaction mixture and after recrystallization from methyl alcohol was obtained as reddish brown plates. The compound has the following formula:

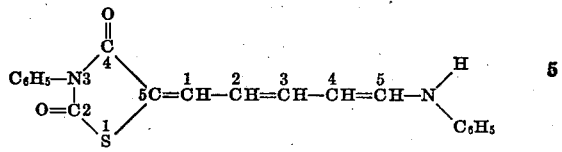

Example 15.—5-(ω-acetanilido-Δ2,4-pentadienylidene)-3-ethylrhodanine 3.2 g. (1 mol.) of 3-ethylrhodanine, 5.6 g. (1 mol.) of glutaconic aldehyde dianilide hydrochloride, 40 cc. of absolute ethyl alcohol and 2 g. (1 mol.) of triethylamine were heated to refluxing for about three minutes. The compound separated from the cooled reaction mixture. The compound was heated to boiling with 50 cc. of acetic anhydride to produce the acetanilido derivative. The acetanilido derivative has the following formula:

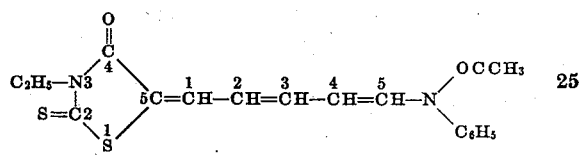

In a manner similar to that illustrated in the above two examples other heterocyclic compounds containing a nuclear methylene group adjacent to a nuclear carbonyl or thiocarbonyl group can be reacted with ω-arylamino-Δ2,4-pentadienal anils to give hemitricarboxonol dyes. Examples of such other heterocyclic compounds correspond to the five- and six-membered heterocyclic nuclei named in connection with the above general formula for these hemioxonol dyes.

I have further found that dyes similar in some respects to these hemioxonol dyes can be prepared by reacting diarylformamidines, arylamino acrolein anils or arylamino glutaconic aldehyde anils with homocyclic compounds containing a nuclear methylene group adjacent to a carbonyl or thiocarbonyl group as well as with open chain compounds containing a methylene group adjacent to a carbonyl or thiocarbonyl group. In other words, I have found the reaction to be a very general one and capable of wide application. The reaction can be carried out as illustrated in the above fifteen examples. Examples of homocyclic and open chain compounds which will undergo reactions are: 1,3-cyclohexadione, benzoylaceto-nitrile, cyano-acetanilide, malonic acid or its esters, pyruvic acid or its ester, acetoacetic ester, benzoyl-acetone, acetylacetone, indandione or the like. The following example illustrates the preparation of a dye from benzoylacetonitrile.

Example 16.—α(γ-anilido-allylidene)-benzoylacetonitrile 1.45 g. (1 mol.) of benzoylacetonitrile, 2.5 g. (1 mol.) of β-anilinoacrolein anil hydrochloride, 20 cc. of absolute ethyl alcohol and 1.0 g. (1 mol.) of triethylamine were refluxed for about 30 minutes. The product separated from the cooled reaction mixture.

This compound can be acetylated as follows: 5.5 g. (1 mol.) of the anilido compound, 40 cc. of acetic anhydride and 2.0 g. of triethylamine were heated at 100° C. for about 10 minutes. The acetylated product separated from the cooled reaction mixture. After two recrystallizations from methyl alcohol, the product was obtained as yellow needles melting at 208°-210° C. with decomposition. The acetylated product has the following formula:

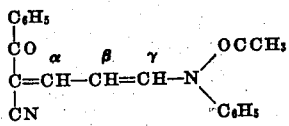

Some of these dyes from homocyclic and open chain compounds alter the sensitivity of photographic silver halide emulsions.

The hemioxonol dyes corresponding to the formula given above show a novel alteration of the sensitivity of photographic silver salt emulsions, particularly silver halide emulsions. Accordingly, my invention is directed to the customarily employed silver halide emulsions. However, the light-sensitive material employed in the emulsions of my invention can be any light-sensitive silver salt alone or combined with another silver salt, such as a silver halide. My invention is further particularly directed to the customarily employed gelatin emulsions, gelatin being the carrier or medium in which the light-sensitive salt is suspended. However, any other suitable carrier, such as a cellulose derivative or a synthetic resin, which has substantially no desensitizing effect on the silver salt can be used.

The alteration in sensitivity produced by these hemioxonol dyes will be illustrated with particular reference to gelatino-silver-chloride and bromide emulsions, since it is in these emulsions that the dyes have been found to be most useful. The dyes containing the shorter chain of methenyl groups are generally most useful in silver chloride emulsions. The illustrations will be made with particular reference to the hemicarboxonol dyes and hemidicarboxonol dyes as the results obtained with dyes from these two groups are most useful.

Figure 2:
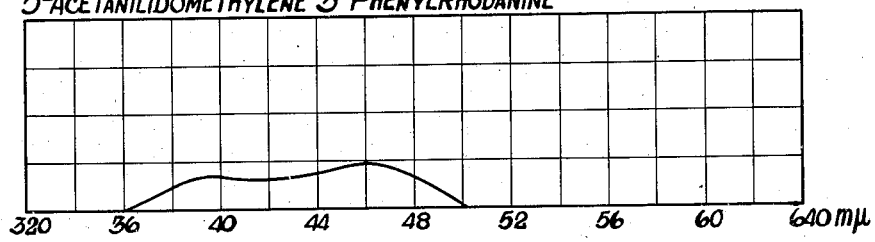
Figure 3:
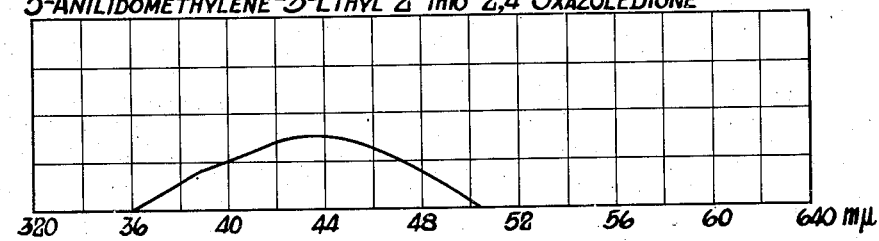
Figure 4:
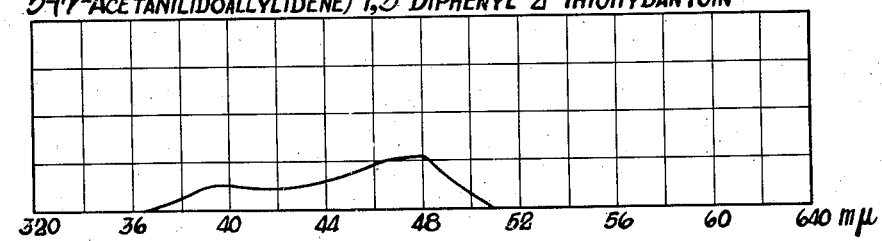
Figure 5:
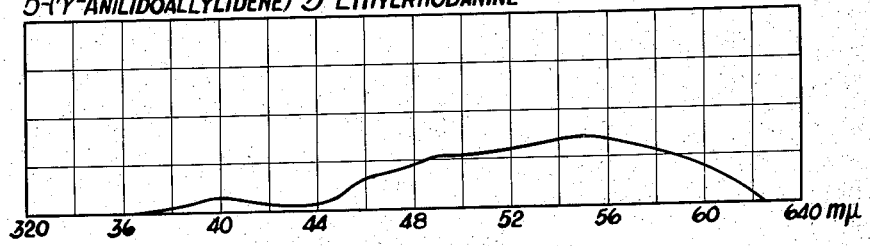
Figure 6:
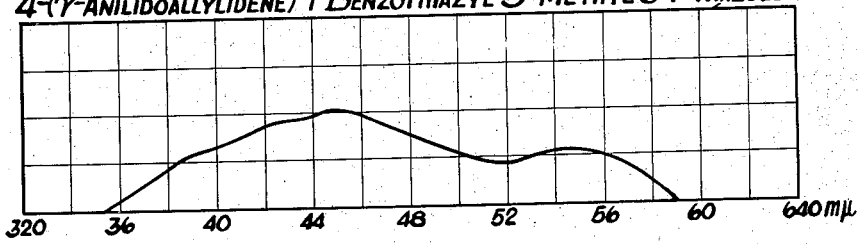
Figure 7:
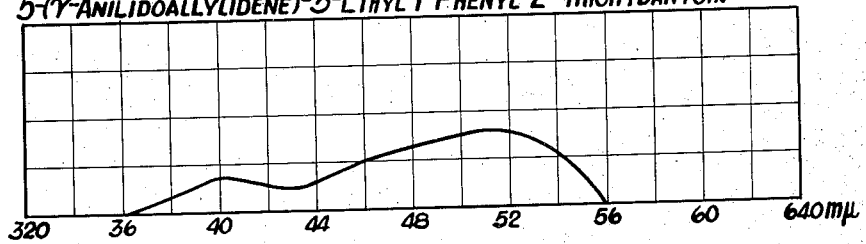
Figure 8:
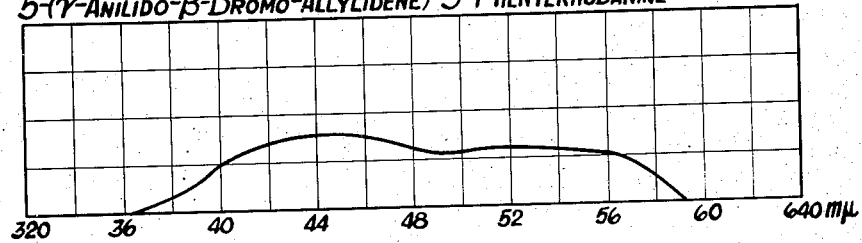

Fig. 1 of the accompanying drawings illustrates diagrammatically the sensitivity of a gelatino-silver-chloride emulsion containing 10 mg. of 5-anilidomethylene-3-ethylrhodanine per liter of emulsion; Fig. 2 a gelatino-silver-chloride emulsion containing 10 mg. of 5-acetanilidomethylene-3-phenylrhodanine per liter of emulsion; Fig. 3 a gelatino-silver-chloride emulsion containing 10 mg. of 5-anilidomethylene-3-ethyl-2-thio-2,4(3,5)-oxazoledione per liter of emulsion; Fig. 4 a gelatino-silver-chloride emulsion containing 10 mg. of 5-(γ-acetanilidoallylidene-1,3-diphenyl-2-thiohydantoin per liter of emulsion; Fig. 5 a gelatino-silver-chloride emulsion containing 10 mg. of 5-(γ-anilidoallylidene)-3-ethyl-rhodanine per liter of emulsion; Fig. 6 a gelatino-silver-bromide emulsion containing 10 mg. of 4-(γ-anilidoallylidene)-1-benzothiazyl-3-methyl-5-pyrazolone per liter of emulsion; Fig. 7 a gelatino-silver-chloride emulsion containing 10 mg. of 5-(γ-anilidoallylidene)-3-ethyl-1-phenyl-2-thiohydantoin per liter of emulsion; and Fig. 8 a gelatino-silver-bromide emulsion containing 10 mg. of 5-(γ-anilido-β-brom-allylidene)-3-phenylrhodanine per liter of emulsion. As is well known in the art of emulsion making, dyes are conveniently incorporated in emulsions by adding to the emulsion a solution of the dye in an appropriate solvent.

The herein described dyes may be substituted on the nuclei with groups such as alkyl, alkoxyl, chloro, bromo, amino or the like. Some of the herein described dyes show small desensitizing effects together with sensitizing effects in another range of the spectrum.

The herein disclosed dyes are also useful in the construction of light filters and as coloring matters for textiles, particularly cellulose acetate silk or the like.

It is to be understood that the herein disclosed dyes probably exist in two forms, to wit:

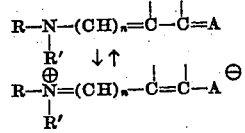

As illustrated these forms are interconvertible one into the other, i. e. the forms are virtual tautomers.

What I claim as my invention and desire to be secured by Letters Patent of the United States of America is:

1. A photographic silver salt emulsion containing a sensitizing dye selected from the group of dyes characterized by the following formula:

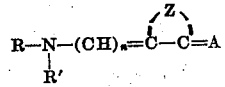

wherein A represents an atom selected from the group consisting of oxygen and sulfur, $n$ represents a positive odd integer not greater than five, R represents a substituent selected from the group consisting of hydrogen, alkyl groups and acyl groups, R' represents an aryl group selected from the group consisting of aryl groups of the benzene and naphthalene series and Z represents the non-metallic atoms necessary to complete a heterocyclic nucleus selected from the group consisting of five-membered and six-membered heterocyclic nuclei.

2. A photographic silver halide emulsion containing a sensitizing dye selected from the group of dyes characterized by the following formula:

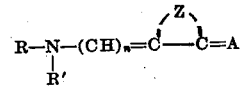

wherein A represents an atom selected from the group consisting of oxygen and sulfur, $n$ represents a positive odd integer not greater than five, R represents a substituent selected from the group consisting of hydrogen, alkyl groups and acyl groups, R' represents an aryl group selected from the group consisting of aryl groups of the benzene and naphthalene series and Z represents the non-metallic atoms necessary to complete a heterocyclic nucleus selected from the group consisting of five-membered and six-membered heterocyclic nuclei.

3. A gelatino-silver-halide emulsion containing a sensitizing dye selected from the group of dyes characterized by the following formula:

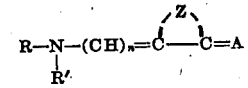

wherein A represents an atom selected from the group consisting of oxygen and sulfur, $n$ represents a positive odd integer not greater than five, R represents a substituent selected from the group consisting of hydrogen, alkyl groups and acyl groups, R' represents an aryl group selected from the group consisting of aryl groups of the benzene and naphthalene series and Z represents the non-metallic atoms necessary to complete a heterocyclic nucleus selected from the group consisting of five-membered and six-membered heterocyclic nuclei.

4. A gelatino-silver-halide emulsion containing a sensitizing dye selected from the group of dyes characterized by the following formula:

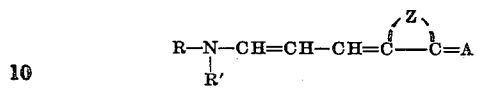

wherein A represents an atom selected from the group consisting of oxygen and sulfur, R represents a substituent selected from the group consisting of hydrogen, alkyl groups and acyl groups, R' represents an aryl group selected from the group consisting of aryl groups of the benzene and naphthalene series and Z represents the non-metallic atoms necessary to complete a heterocyclic nucleus selected from the group consisting of five-membered heterocyclic nuclei and six-membered heterocyclic nuclei.

5. A gelatino-silver-halide emulsion containing a sensitizing dye selected from the group of dyes characterized by the following formula:

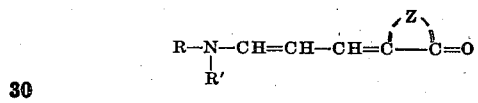

wherein R represents a substituent selected from the group consisting of hydrogen, alkyl groups and acyl groups, R' represents an aryl group selected from the group consisting of aryl groups of the benzene and naphthalene series and Z represents the non-metallic atoms necessary to complete a 3-alkyl-2,4(3,5)-oxazoledione nucleus.

6. A gelatino-silver-halide emulsion containing a sensitizing dye selected from the group of dyes characterized by the following formula:

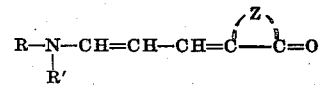

wherein R represents a substituent selected from the group consisting of hydrogen, alkyl groups and acyl groups, R' represents an aryl group selected from the group consisting of aryl groups of the benzene and naphthalene series and Z represents the non-metallic atoms necessary to complete a 2-diphenylamino-4(5)-thiazolone.

7. A gelatino-silver-halide emulsion containing a sensitizing dye selected from the group of dyes characterized by the following formula:

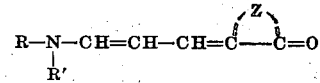

wherein R represents a substituent selected from the group consisting of hydrogen, alkyl groups and acyl groups, R' represents an aryl group selected from the group consisting of aryl groups of the benzene and naphthalene series and Z represents the non-metallic atoms necessary to complete a 1-benzothiazyl-3-methyl-5-pyrazolone nucleus.

8. A gelatino-silver-halide emulsion sensitized with 5 - ($\gamma$ - acetanilido-allylidene)-2 - diphenylamino-4(5)-thiazolone.

9. A photographic gelatino-silver-halide emulsion sensitized with 5-($\gamma$-acetanilido-allylidene)-3-ethyl-2,4(3,5)-oxazoledione.

10. A photographic gelatino-silver-halide emulsion sensitized with 4-($\gamma$-acetanilido-allylidene)-1-benzothiazyl-3-methyl-5-pyrazolone.

LESLIE G. S. BROOKER.